United States Patent
Meaden

(10) Patent No.: US 6,795,096 B2
(45) Date of Patent: Sep. 21, 2004

(54) METHOD TO REFRESH VIEW OF A COLLECTION OF OBJECTS

(75) Inventor: Jeffrey Alan Meaden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 09/817,132

(22) Filed: Mar. 26, 2001

(65) Prior Publication Data

US 2002/0135616 A1 Sep. 26, 2002

(51) Int. Cl.⁷ ............................................. G06F 15/00
(52) U.S. Cl. ....................................... 345/764; 345/849
(58) Field of Search ................................. 345/853, 854, 345/849, 763, 764, 762

(56) References Cited

U.S. PATENT DOCUMENTS

| | | | |
|---|---|---|---|
| 5,060,170 A | 10/1991 | Bourgeois et al. | |
| 5,140,678 A | 8/1992 | Torres | |
| 5,204,947 A | 4/1993 | Bernstein et al. | |
| 5,241,656 A | 8/1993 | Loucks et al. | |
| 5,283,560 A | 2/1994 | Bartlett | |
| 5,377,317 A | 12/1994 | Bates et al. | |
| 5,434,965 A | 7/1995 | Matheny et al. | |
| 5,491,795 A | 2/1996 | Beaudet et al. | |
| 5,550,563 A | 8/1996 | Matheny et al. | |
| 5,581,670 A | 12/1996 | Bier et al. | |
| 5,590,265 A | 12/1996 | Nakazawa | |
| 5,598,524 A | 1/1997 | Johnston, Jr. et al. | |
| 5,608,850 A | 3/1997 | Robertson | |
| 5,617,114 A | 4/1997 | Bier et al. | |
| 5,621,878 A | 4/1997 | Owens et al. | |
| 5,630,080 A | 5/1997 | Malamud et al. | |
| 5,764,229 A | 6/1998 | Bennett | |
| 5,805,163 A | 9/1998 | Bagnas | |
| 5,831,615 A | 11/1998 | Drews et al. | |
| 5,835,091 A | 11/1998 | Bailey et al. | |
| 5,892,512 A | * 4/1999 | Donnelly et al. ............. 345/839 |
| 6,147,687 A | * 11/2000 | Wanderski ................... 345/853 |
| 6,654,766 B1 | * 11/2003 | Degenaro ....................... 707/4 |

* cited by examiner

Primary Examiner—Cao Nguyen
(74) Attorney, Agent, or Firm—Moser, Patterson & Sheridan, LLP

(57) ABSTRACT

Embodiments provided herein include methods and systems for conditionally refreshing a collection view. As used herein, "collection view" refers to a collection of objects presented in a user interface environment, such as a graphical user interface (GUI). In general, a collection view is refreshed only once all of the selected objects have been processed. In addition, the view is refreshed only if an action performed on any of the selected objects affects the view. In one embodiment, a determination is made as to whether the actions completed successfully prior to determining whether a view is affected.

25 Claims, 9 Drawing Sheets

METHOD TO REFRESH VIEW OF A COLLECTION OF OBJECTS

BACKGROUND OF THE INVENTION

1. Field of the Invention

Embodiments of the present invention relate to refreshing methods and systems. In particular, methods and systems for refreshing a view of a collection of objects are provided.

2. Background of the Related Art

In a user interface environment, a collection of objects can be presented to the user in some aggregate form (e.g., a list). This presentation may be generically referred to as a "collection view". The user can then select one or more objects to process from the collection view and then select an action to perform. For example, a user may desire to change the properties of one or more objects. At some point, it becomes necessary to refresh the collection view in order to reflect the changes made by the user.

One problem with conventional refresh methods, is the amount of overhead created. Conventional refresh methods are not optimized and therefore consume large amounts of processing time and resources. In general, the collection view tends to be inopportunely refreshed with excessive frequency. Consider the case in which multiple objects are being acted upon. Each action upon each object results in a refreshing event. Accordingly, the overall system efficiency is detrimentally affected.

Therefore, there is a need for a method and system for refreshing a view of objects.

SUMMARY OF THE INVENTION

Methods, articles of manufacture and systems are provided for selectively, or conditionally, refreshing a view of objects. In general, for an action event, a view is refreshed if both an object is affected by an action and all actions of the action event are processed.

In one embodiment, a system for conditionally refreshing a view is provided. The system comprises an input device, a display device configured to display a view of at least one object and a processor operably connected to the display device and the input device, wherein the processor is configured to receive input commands from the input device. Further, the processor, when executing a refresh program, is configured to receive an action event indicating that at least one action is to be performed on the at least one object displayed on the display device and track each action of the action event. For each action of the action event, the processor is configured to process the action, determine whether the view has been affected as a result of processing the action, and determine whether all of the actions of the action event have been performed. If the view has been affected and if all of the actions of the action event have been performed, the view is refreshed.

In another embodiment, a method for conditionally refreshing a view of objects on a display device is provided. The method comprises receiving an action event indicating that at least one action is to be performed on at least one object and tracking each action of the action event. For each action of the action event, the method further comprises processing the action, determining whether the view of objects has been affected as a result of processing the action and determining whether all of the actions of the action event have been processed. If the view of objects has been affected and if all of the actions of the action event have been processed, the view is refreshed.

In still another embodiment, a signal bearing medium comprises a program which, when executed by a processor, performs a method for conditionally refreshing a view of objects on a display device. The method comprises receiving an action event indicating that at least one action is to be performed on at least one object and tracking each action of the action event. For each action of the action event, the method further comprises processing the action, determining whether the view of objects has been affected as a result of processing the action and determining whether all of the actions of the action event have been processed. If the view of objects has been affected and if all of the actions of the action event have been processed, the view is refreshed.

BRIEF DESCRIPTION OF THE DRAWINGS

So that the manner in which the above recited features and embodiments are attained and can be understood in detail, a more particular description of embodiments of the invention, briefly summarized above, may be had by reference to the embodiments described below and which are illustrated in the appended drawings.

Figure 1:
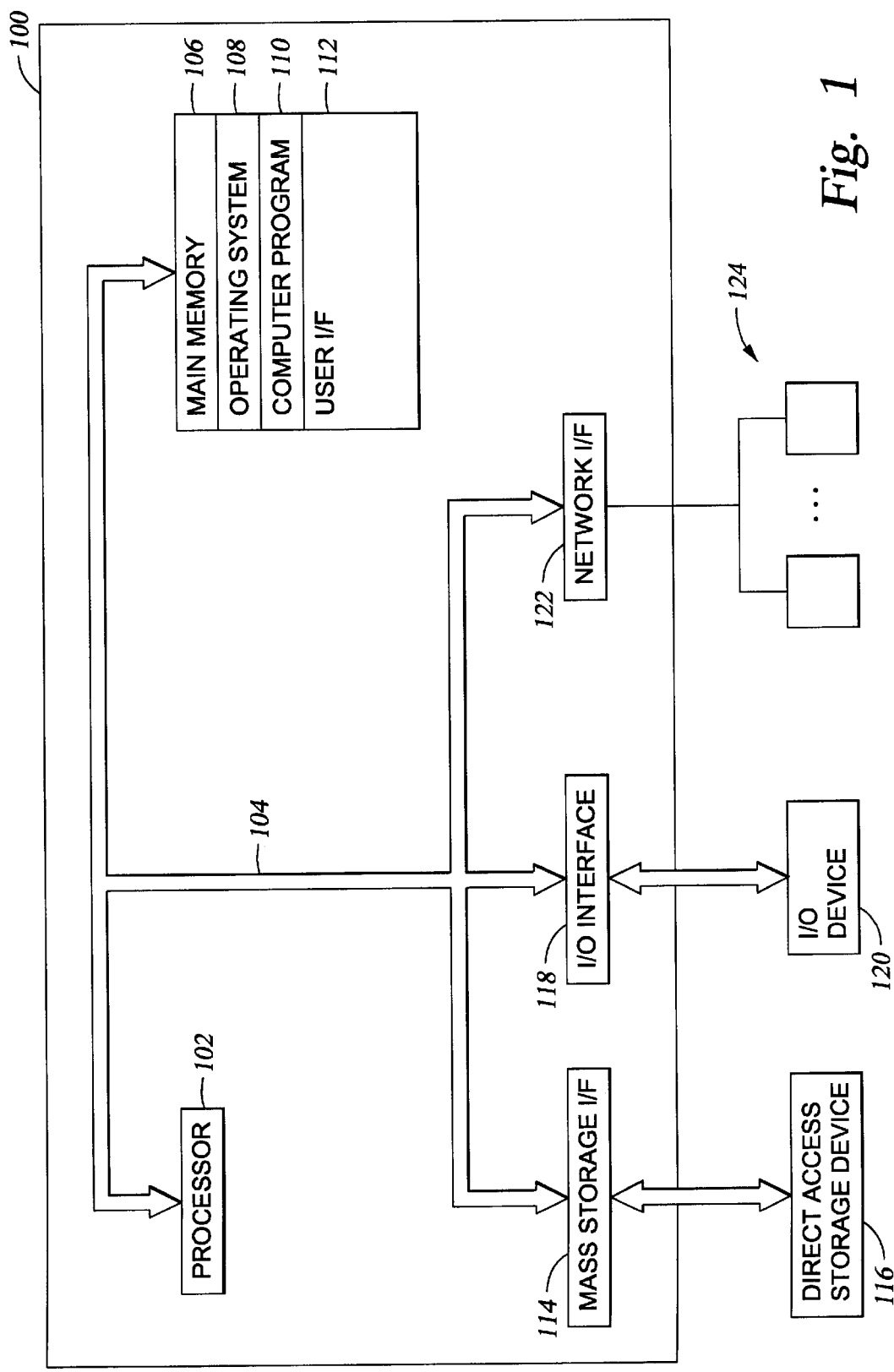
FIG. 1 is a high level diagram of a computer system.

It is to be noted, however, that the appended drawings illustrate only typical embodiments and are therefore not to be considered limiting of scope, for the invention may admit to other equally effective embodiments.

DETAILED DESCRIPTION OF THE PREFERRED EMBODIMENT

Embodiments provided herein include methods and systems for conditionally refreshing a collection view. As used herein, "collection view" refers to a collection of objects presented in a user interface environment, such as a graphical user interface (GUI). In general, a collection view is refreshed only once all of the selected objects have been processed. In addition, the view is refreshed only if an action performed on any of the selected objects affects the view. In one embodiment, a determination is made as to whether the actions completed successfully prior to determining whether a view is affected.

Computer system 100 is shown for a multi-user programming environment that includes at least one processor 102, which obtains instructions and data via a bus 104 from a main memory 106. The processor 102 could be a PC-based server, a minicomputer, a midrange computer, a mainframe computer, etc. adapted to support the methods described below. Illustratively, the processor is a PowerPC available from International Business Machines of Armonk, N.Y.

The main memory 106 includes an operating system 108, a refresh program 110 and a user interface program 112. The main memory 106 could be one or a combination of memory devices, including Random Access Memory, nonvolatile or backup memory, (e.g., programmable or Flash memories, read-only memories, etc.) and the like. In addition, memory 106 may be considered to include memory physically located elsewhere in a computer system 100, for example, any storage capacity used as virtual memory or stored on a mass storage device or on another computer coupled to the computer system 100 via bus 104.

The computer system 100 includes a number of operators and peripheral systems. Illustratively, these include a mass storage interface 114 operably connected to a direct access storage device 116, a input/output (I/O) interface 118 operably connected to I/O devices 120, and a network interface 122 operably connected to a plurality of networked devices 124. The I/O devices may include any combination of displays, keyboards, track point devices, mouse devices, speech recognition devices and the like. In some embodiments, the I/O devices are integrated, such as in the case of a touch screen. The networked devices 124 could be displays, desktop or PC-based computers, workstations, or network terminals, or other networked computer systems.

In general, the routines executed to implement the embodiments of the invention, whether implemented as part of an operating system or a specific application, component, program, object, module or sequence of instructions will be referred to herein as a "refresh program 110", or simply "program 110". The program 110 typically comprises one or more instructions that are resident at various times in various memory and storage devices in a computer, and that, when read and executed by one or more processors in a computer, cause that computer to perform the steps necessary to execute steps or elements embodying the various aspects of the invention.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Moreover, while the embodiments have and hereinafter will be described in the context of fully functioning computers and computer systems, those skilled in the art will appreciate that the various embodiments of the invention are capable of being distributed as a program product in a variety of forms, and that embodiments of the invention apply equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and includes wireless communications. The latter embodiment specifically includes information downloaded from the Internet and other networks. Such signal-bearing media, when carrying computer-readable instructions that direct the functions of the present invention, represent embodiments of the present invention.

When executed, the refresh program 110 is configured to conditionally refresh a collection view displayed on an output device, such as one of the I/O devices 120. A refresh operation is illustrated with reference to FIGS. 2–4. FIG. 2 shows an exemplary user interface (UI) 200, which is a particular implementation of the interface 112 shown in FIG. 1. Illustratively, the UI 200 is a GUI hosting a Windows environment including a plurality of objects 202 contained within a display area (or frame) 204. In other embodiments, the UI 200 may be a green screen environment or any other environment adapted to contain images. Collectively, the objects 202 are referred to as the collection view. In the particular instance shown in FIG. 2, the objects 202 are represented as disk drive icons. However, more generally the objects 202 may be any displayable/viewable item, or image, with which a user or other entity (e.g., program routine) may interact in order to affect changes to the objects 202. Exemplary objects include text file icons, image file icons, shortcuts, desktop icons, folders, files, images, menu items, tool bar icons, buttons, users, groups, servers, workstations, printers, disk drives, I/O devices, applications, processes, threads and the like.

Figure 3:
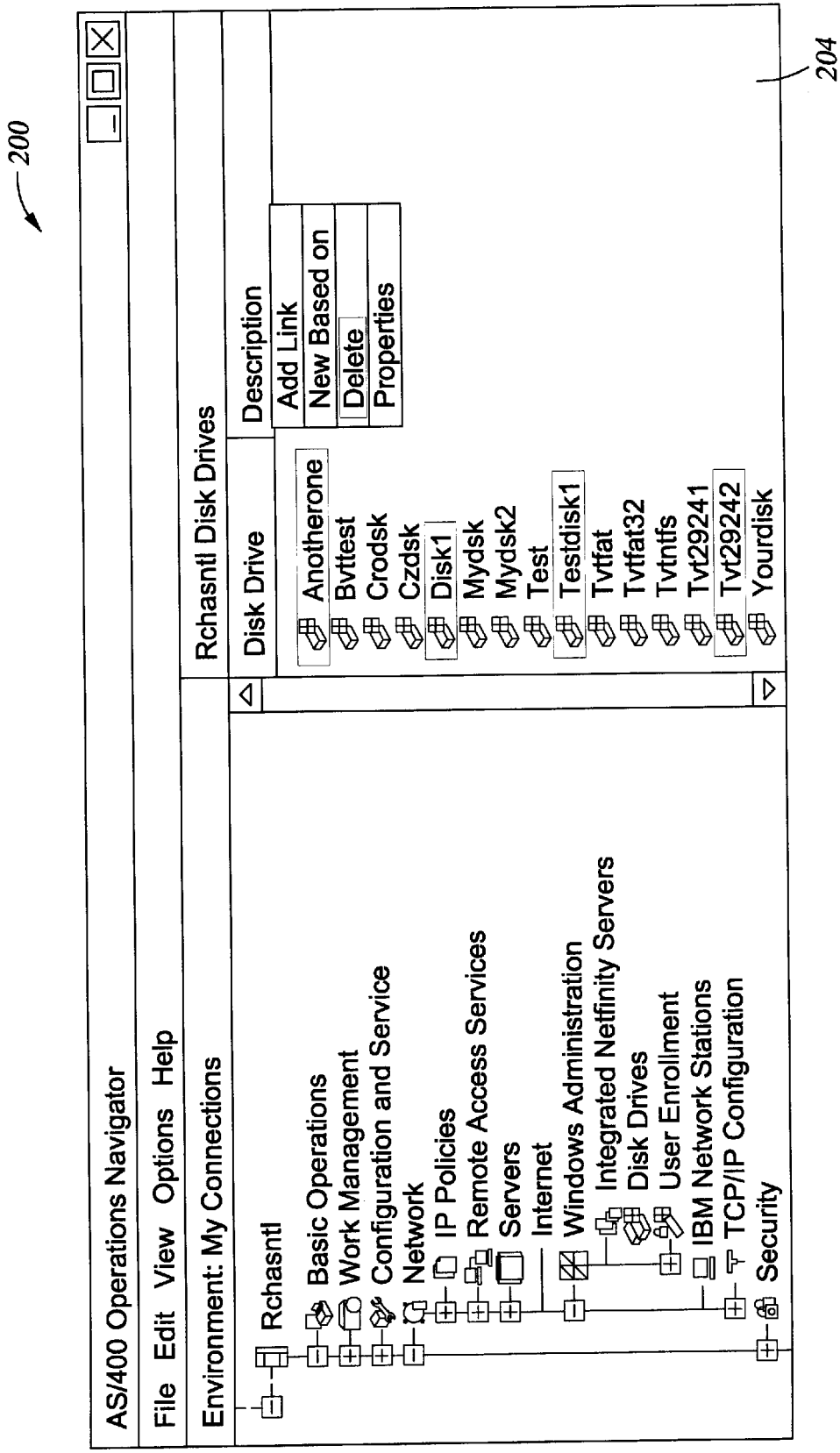
FIG. 3 is a graphical user interface in which selected objects are being deleted.

During interaction with the objects 202, one or more of the objects 202 may be changed or modified. For example, an object may be deleted at the election of the user or other entity (e.g., program routine). FIG. 3 illustrates a situation in which a user takes steps to delete selected objects. In this case, objects "Anotherone", "Disk 1", "Testdisk1" and "Yourdisk" are selected for deletion. Although FIG. 3 shows four objects being deleted, more generally, any number of objects may be modified.

Figure 4:
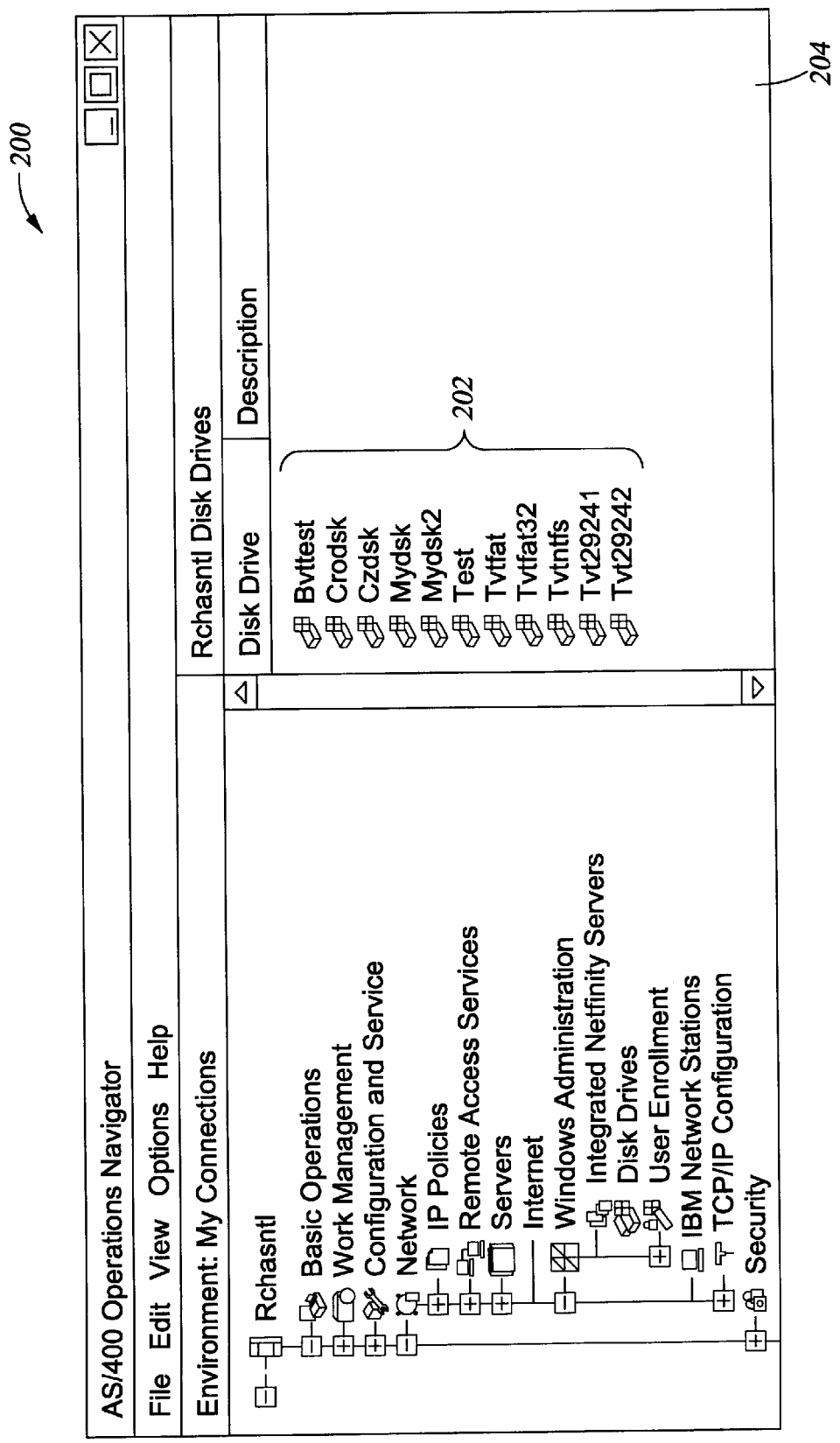
FIG. 4 is a graphical user interface after being refreshed.

In order to accurately represent the collection view after modifying (in this example, deleting) one or more objects, the view must be refreshed. FIG. 4 illustrates a refreshed view after the selected objects (shown in FIG. 3) have been deleted.

Regardless of how many objects are modified and how many actions must be taken with respect to the objects, it is desirable to minimize the amount of time and resources utilized when refreshing a view. Illustrative methods by which a view is refreshed are discussed below.

Figure 2:
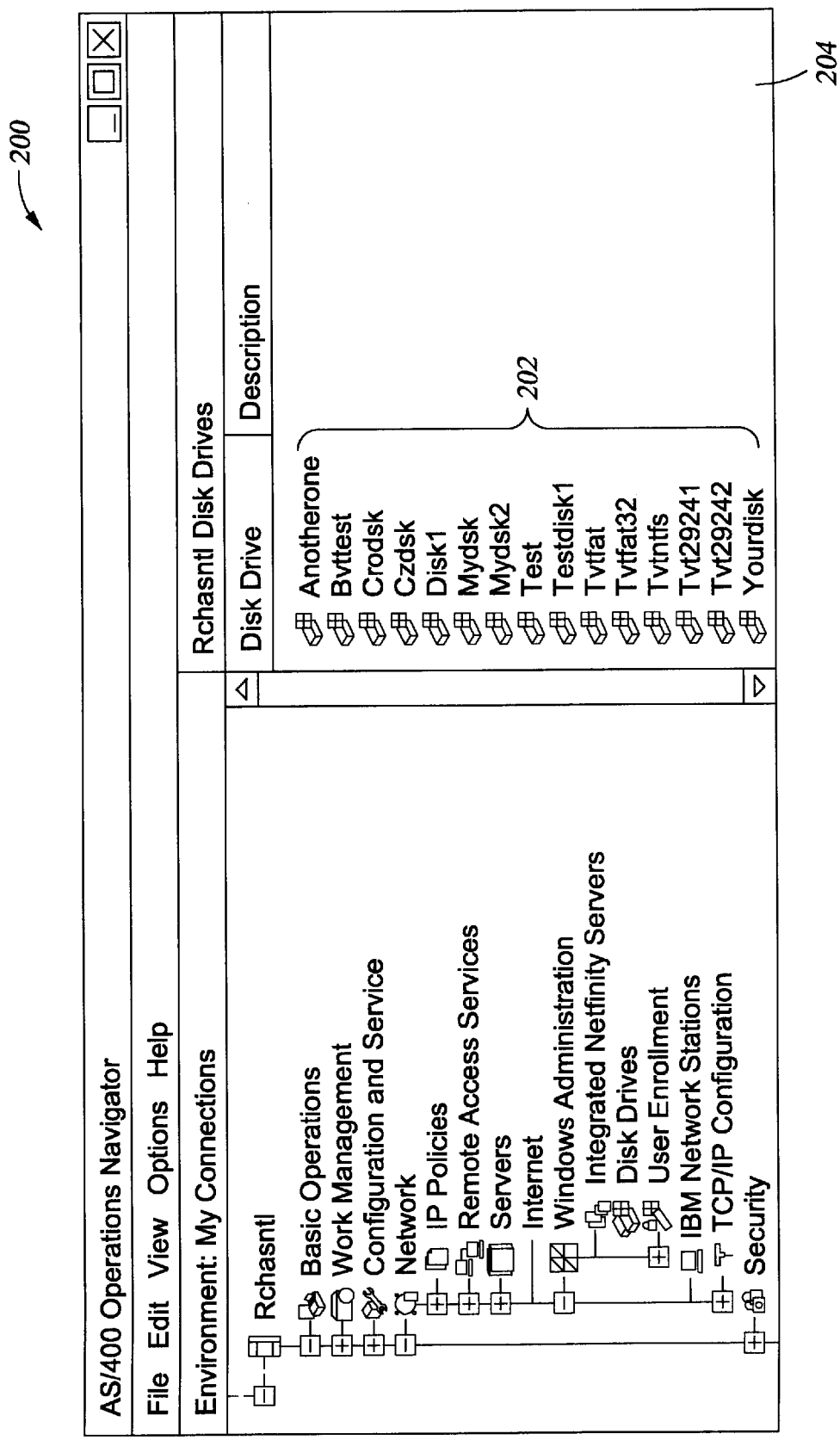
FIG. 2 is a graphical user interface depicting a collection of objects.
Figure 5:
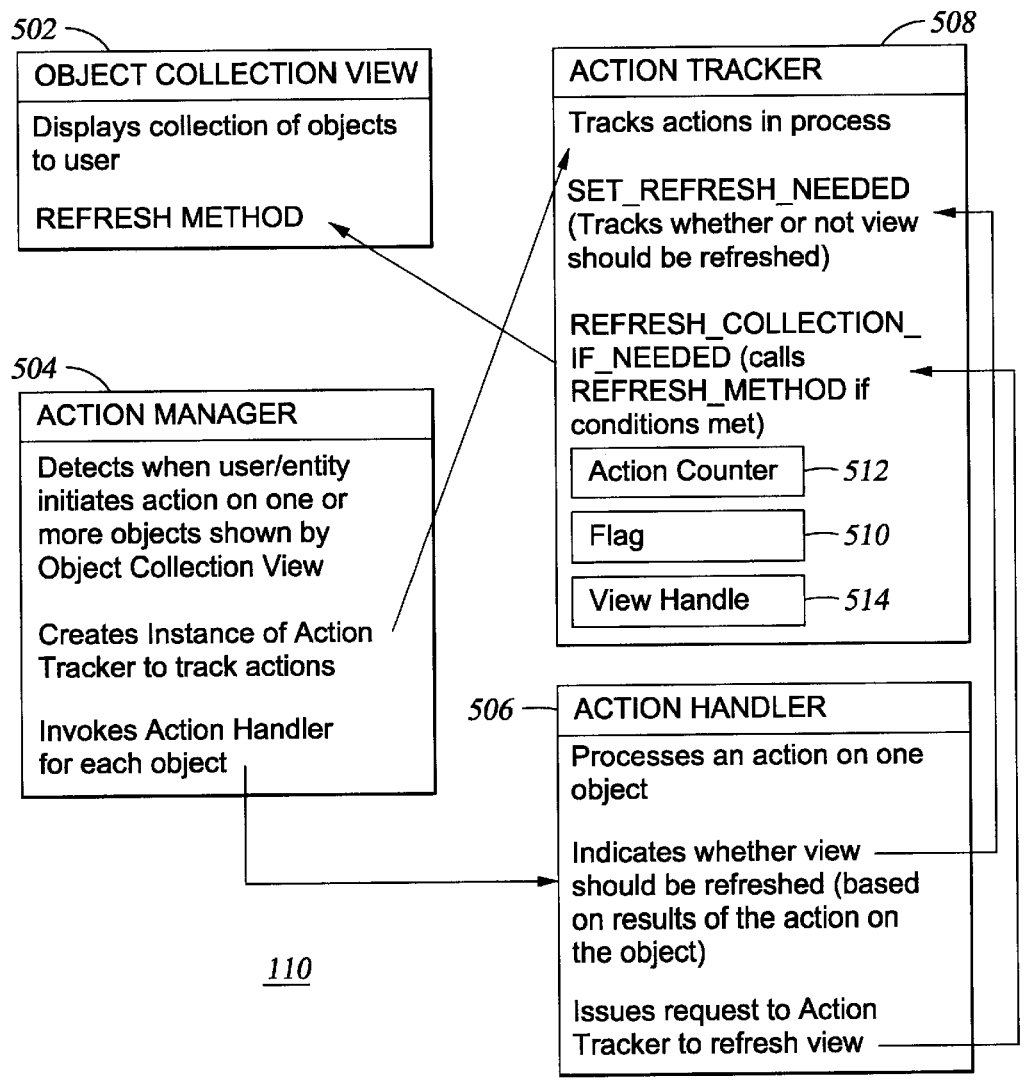
FIG. 5 is a block diagram illustrating relationships between software components of a refreshing program.

The operational relationship of the refresh program 110 may be understood with reference to FIG. 5 which provides an exemplary software environment for the computer system 100 of FIG. 1. In a particular embodiment, the refresh program 110 is implemented as a Java program. However, the particular program language is not germane to embodiments of the invention and is therefore not considered limiting. In other embodiments, languages such as C++, Object Pascal, Smalltalk, Pascal, C, Basic, COBOL and the like.

Generally, the program 110 comprises an Object Collection View 502, an Action Manager 504, an Action Handler 506 and an Action Tracker 508. The Object Collection View 502 (herein also referred to as "View 502") is generally configured to display a collection of objects to a user via, for example, the I/O devices 120. In addition, the View 502 includes a method, REFRESH_METHOD, which may be called to refresh a collection view upon the occurrence of predetermined events.

The Action Manager 504 is configured to detect when an entity (e.g., a user) initiates an action on one or more objects shown by the View 502. For example, in an event-driven embodiment, the Action Manager 504 may be configured to "listen" for events specifying actions on the objects. Upon detection of an action, the Action Manager 504 creates an instance of the Action Tracker 508, which is responsible for tracking all actions in process. To this end, the Action Manager 504 passes an object collection view handle to the Action Tracker 508. The handle is provided as part of the event specifying actions to be taken. The Action Manager 504 also passes the number of actions to be taken to the Action Tracker 508. In addition, the Action Manager 504 invokes an instance of the Action Handler 506 for each object being acted upon.

The Action Handler 506 is generally responsible for processing each action on a given object. Accordingly, the Action Handler 506 responds to input parameters initially supplied by a user or other entity interfacing with one or more of the objects. Based upon the results of the action on the object, the Action Handler 506 indicates whether the view should be refreshed. In a particular embodiment, such an indication is manifested by calling a method, SET__REFRESH_NEEDED, whenever some visible attribute of the object in the collection view is affected by an action.

The indication generated by the Action Handler 506 is provided to the Action Tracker 508, which is responsible for tracking each action in process and whether or not a given view should be refreshed. In one embodiment, action tracking is facilitated by uniquely identifying a collection view. For example, a handle, or pointer, may be defined for the collection view. Accordingly, Action Tracker 508 comprises a handle buffer 514 for storing the handles. In addition, an action counter 512 contains a value representing the number of actions to be performed for a given action event. As described above, these values are provided by the Action Manager 504. The SET_REFRESH_NEEDED method is defined for the Action Tracker 508 and is selectively called by the Action Handler 506, as described above. When SET_REFRESH_NEEDED method is called, a value of a flag 510 is set to TRUE, indicating that a given view has been affected by execution of an action. A REFRESH__COLLECTION_IF_NEEDED method is defined for the Action Tracker 508 and is called unconditionally by the Action Handler 506 just before the Action Handler 506 exits. If the conditions for a refreshed view are satisfied, the REFRESH_COLLECTION_IF_NEEDED method of the Action Tracker 508 uses the Object Collection View handle to call the REFRESH_METHOD of the Object Collection View 502.

Figure 6:
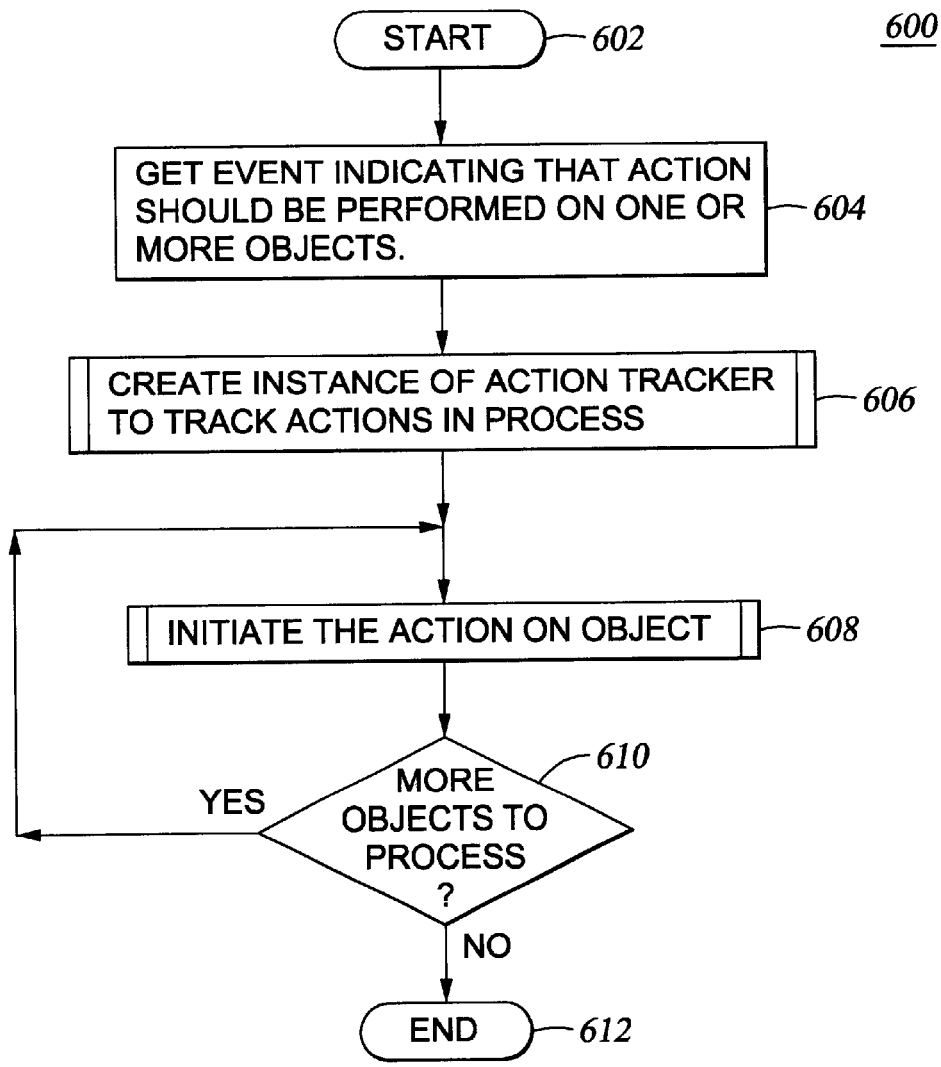
FIG. 6 is a flow chart illustrating the operation of an action manager.

FIG. 6 shows one embodiment of the method 600 exemplifying the operation of the Action Manager 504. The method 600 is entered at step 602 and proceeds to step 604 where an action event is received for processing. The action event is any event indicating that N actions are to be performed on one or more objects being displayed by the Object Collection View 502, where $N \geq 1$. For example, the action event may be a user initiated election to delete an icon, which would be one action; or the action event may include deletion of two icons, which would be two actions. For a given action event on two or more objects, the action need not be the same for each object. Thus, one action of an action event may be to delete an object and a second action of the event may be to change a file name.

Each action event also includes a handle to the object collection view. The handle may be any unique identifier identifying a particular collection view, wherein the collection view is the aggregate of all objects in a predetermined display area (e.g. a window or a frame of a window). In particular, the handle identifies the collection view in which the action event is occurring. As will be described in more detail below, the handle is used to call the REFRESH__METHOD if the associated view needs to be refreshed.

Figure 7:
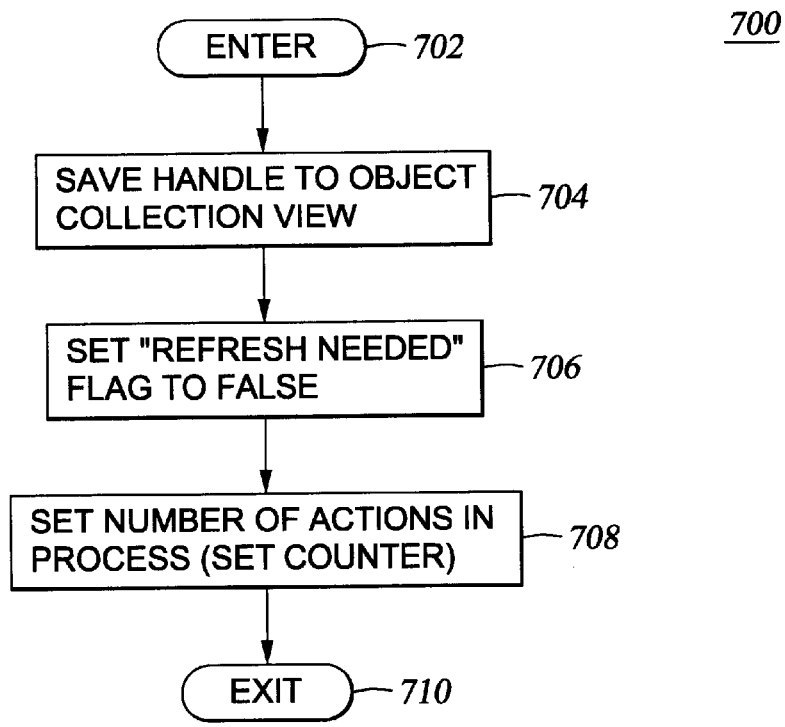
FIG. 7 is a flow chart illustrating the initialization of an action tracker.

At step 606, an instance of the Action Tracker 508 is created. Illustratively, the Action Tracker 508 is created by the Action Manager 504. Step 606 includes passing the object collection view handle and a list of the objects and actions to the Action Tracker 508. The handle is stored to the buffer 514 and the list of actions is used to set a value in the action counter 512. One embodiment of step 606 is shown in FIG. 7 and described below.

Figure 8:
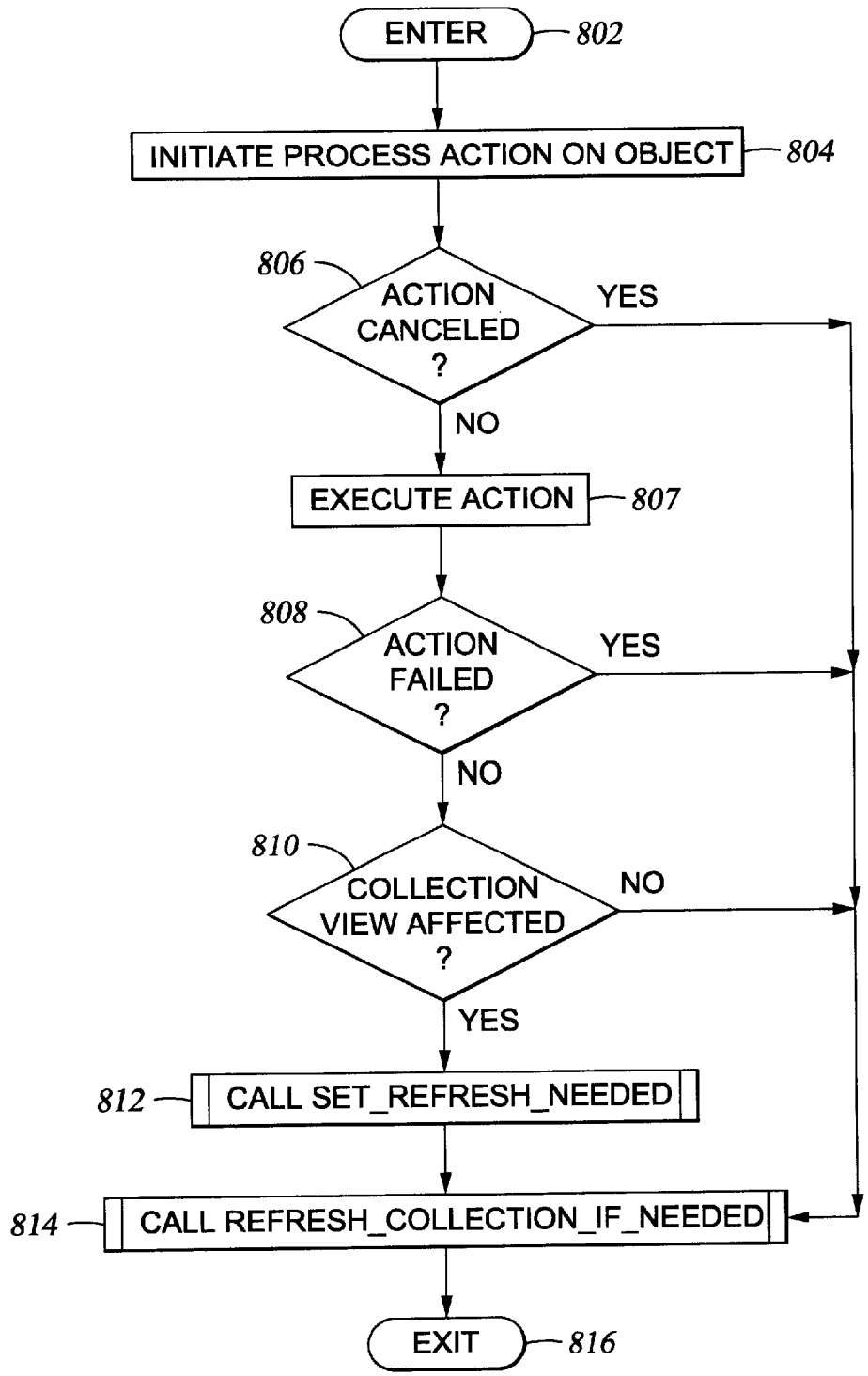
FIG. 8 is a flow chart illustrating the operation of an action handler.

At step 608, the action event received at step 604 is executed for one of the selected objects. In particular, an instance of the Action Handler 506 is invoked to initiate the action on the object. One embodiment of step 608 is shown in FIG. 8 and described below.

The method 600 then proceeds to step 610 and queries whether additional objects are to be processed by the action event. If so, the method 600 returns to step 608 to begin processing the next object. Once each of the selected objects have been processed according to the action, the method 600 ends at step 612.

Method 600 assumes a serial processing strategy. That is, each action is processed sequentially and then, after all actions are processed, the method 600 exits. In another embodiment, however, the actions may be processed in parallel as threads. In this case, the method 600 may be exited for a given action prior to execution of all actions.

FIG. 7 shows one embodiment of a method 700 illustrating the initialization of the Action Tracker 508. The method 700 is entered at step 702 and proceeds to step 704 where a handle to a collection view is stored to the buffer 514. At step 706, the "refresh needed" flag 510 is set to FALSE. At step 708, the counter 512 is set according to the number of actions to process. For example, in the illustration described with reference to FIGS. 2–4, four DELETE actions were taken. Accordingly, in that case, the value of the counter 512 is set to four (4). The method 700 is then exited at step 710 and proceeds to the next step of method 600 as described above.

A method 800 illustrating the operation of the Action Handler 506 is shown in FIG. 8. The method 800 is entered at step 802 and proceeds to step 804 where an action for an object is initiated. In some cases, an action selected by a user may be canceled, fail or otherwise terminate prior to completion. In such cases, it is not necessary and undesirable to refresh a view. Accordingly, at step 806, the method 800 queries whether the action was canceled. If so, the method 800 proceeds to step 814, which is discussed below. If the action is not canceled, the action is executed at step 807. At step 808, the method 800 queries whether the action failed. If so, the method 800 proceeds to step 814. Otherwise, the method 800 proceeds to step 810 and queries whether the collection view has been affected by the action. As defined herein, a collection view is affected if any visible attribute of the collection view is changed by the action. If the collection view is not affected, the method 800 proceeds to step 814. If the view is affected, the method 800 proceeds to step 812 where the SET_REFRESH_NEEDED method is called. One embodiment of the step 812 is described below with reference to FIG. 9. Subsequently, the REFRESH_COLLECTION_IF_NEEDED method is called at step 814. One embodiment of the step 814 is described below with reference to FIG. 10. The method 800 is then exited at step 816 and proceeds to the next step of method 600 as described above.

Figure 9:
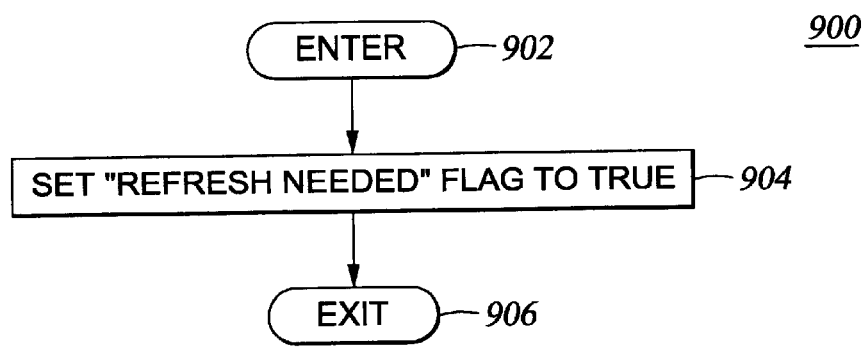
FIG. 9 is a flow chart illustrating a method of the action tracker for setting a flag.

One embodiment of a SET_REFRESH_NEEDED method 900 is shown in FIG. 9. The method 900 is entered at step 902 from step 812, described above, and proceeds to step 904 where the flag 510 is set to TRUE. The method 900 then exits at step 906 and returns to method 800.

Figure 10:
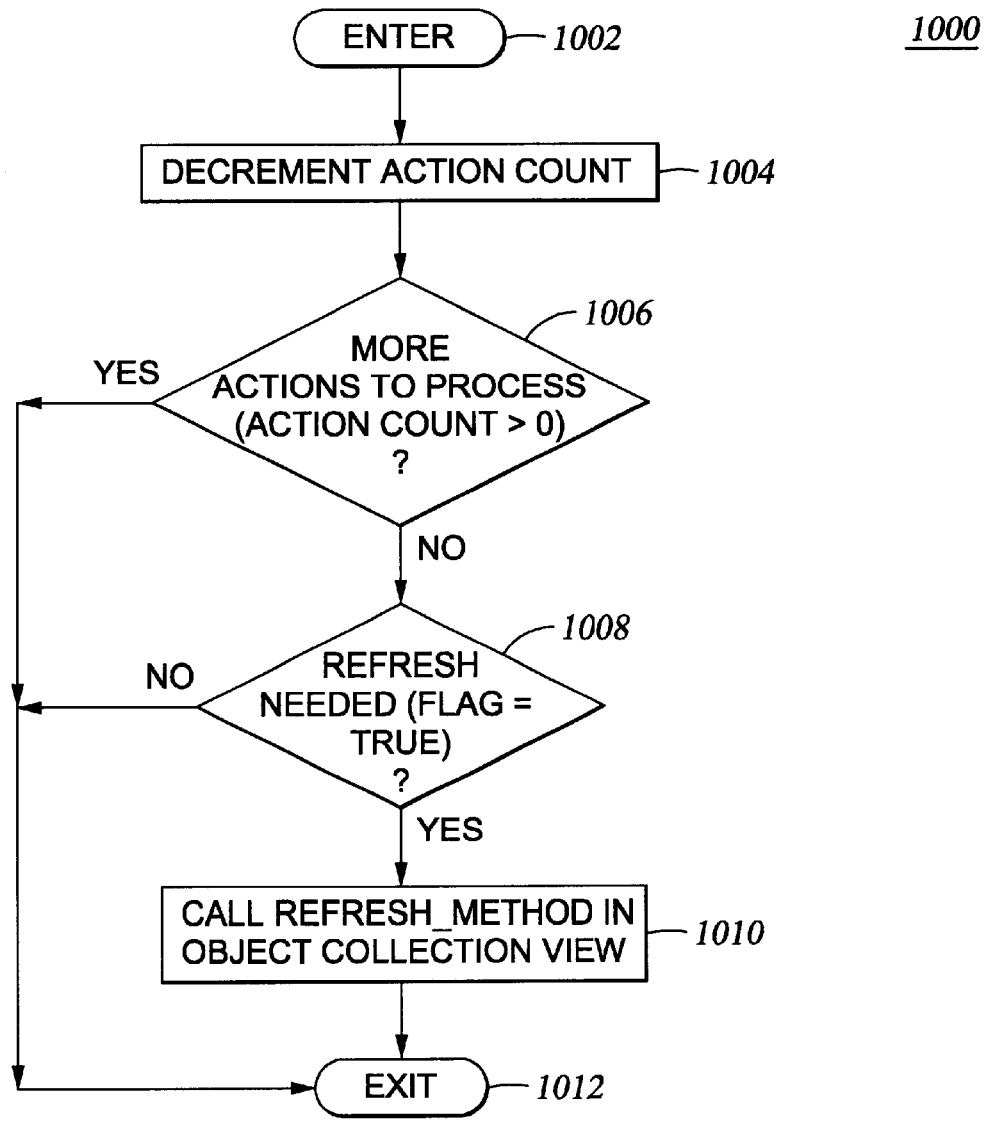
FIG. 10 is a flow chart illustrating a method of the action tracker for refreshing a view.

One embodiment of a REFRESH_COLLECTION_IF_NEEDED method 1000 is shown in FIG. 10. The method 1000 is entered at step 1002 from step 814, described above, and proceeds to step 1004 where the action counter 512 is decremented by a value of one (1). At step 1006, the method 1000 queries whether additional actions in the action event received at step 604 (described above) require processing. This determination is made by accessing the action counter 512 and determining whether it's value is greater than zero. If the value of the counter 512 is greater than zero, then additional actions require processing. In this case, the method 1000 exits at step 1012 and returns to the method 800 described above. Accordingly, if the value of the counter 512 is greater than zero, the present view is left unchanged. Alternatively, if the action counter value is zero, i.e., no additional actions require processing, the method 1000 proceeds to step 1008 and queries whether the flag 510 is set to TRUE. If step 1008 is answered negatively, the method 1000 exits at step 1012. If step 1008 is answered affirmatively, REFRESH_METHOD is called at step 1010, whereby the view is refreshed. In particular, the view to be refreshed is identified according to the handle stored at step 704. The handle identifies the Object Collection View 502 and is used to call the REFRESH_METHOD.

Accordingly, if either the value of the action counter 512 is greater than zero or if the value of the flag 510 is set to FALSE, then the present view is left unchanged. Conversely, if the value of the action counter 512 is zero and the value of the flag 510 is set to TRUE, then the view is refreshed. In this manner, the number of times a view is refreshed is minimized to reduce overhead of time and resources.

The steps defined with reference to FIGS. 8–10 are repeated for each action (as indicated by step 610) until the counter equals zero. Processing for a given action event then terminates at step 612.

While the foregoing is directed to the preferred embodiment of the present invention, other and further embodiments of the invention may be devised without departing from the basic scope thereof, and the scope thereof is determined by the claims that follow.

What is claimed is:

1. A system, comprising:
   an input device;
   a display device configured to display a view of at least one object; and
   a processor operably connected to the display device and the input device and configured to receive input commands from the input device; wherein the processor, when executing a refresh program, is configured to:
   (a) receive an action event indicating that at least one action is to be performed on the at least one object displayed on the display device;
   (b) track each action of the action event;
   (c) for each action of the action event:
      (i) process the action;
      (ii) determine whether the view has been affected as a result of processing the action;
   (d) determine whether all of the actions of the action event have been performed; and
   (e) refresh the view, only if the view has been affected and if all of the actions of the action event have been performed.

2. The system of claim 1, wherein the action event is received from the input device.

3. The system of claim 1, wherein if either the view has not been affected or if all of the actions of the action event have not been performed, then the refresh program is configured to leave the view unchanged.

4. The system of claim 1, wherein if the view has not been affected then the refresh program is configured to leave the view unchanged.

5. The system of claim 1 wherein if all of the actions of the action event have not been performed, then the refresh program is configured to leave the view unchanged.

6. The system of claim 1, wherein the at least one object is an icon.

7. The system of claim 1, wherein processing the action is selected from one of performing the action or terminating the action.

8. The system of claim 7, wherein for each action the processor is configured to perform, the processor is further configured to set a value indicating that the view is to be refreshed and for each action the processor is configured to terminate, the processor is further configured to leave the value unchanged.

9. A method for conditionally refreshing a view of objects on a display device, comprising:
   receiving an action event indicating that at least one action is to be performed on at least one object;
   tracking each action of the action event;
   for each action of the action event:
      (i) processing the action;
      (ii) determining whether the view of objects has been affected as a result of processing the action;
   determining whether all of the actions of the action event have been processed;
   refreshing the view of objects, only if the view of objects has been affected and if all of the actions of the action event have been processed.

10. The method of claim 9, wherein tracking each action of the action event comprises setting a counter value equal to a number of actions for the action event.

11. The method of claim 9, wherein refreshing comprises calling a refresh method using a view identifier value uniquely identifying the view of objects.

12. The method of claim 9, wherein receiving the action event indicating that at least one action is to be performed on at least one object comprises receiving an input to perform more than one action on more than one object.

13. The method of claim 9, wherein receiving the action event indicating that at least one action is to be performed on at least one object comprises receiving an input to perform more than one action on the at least one object.

14. The method of claim 9, wherein the at least one object comprises at least one of shortcuts, desktop icons, folders, files, images, menu items, tool bar icons, buttons, users, groups, servers, workstations, printers, disk drives, I/O devices, applications, processes, and threads.

15. The method of claim 9, wherein if either the view of objects has not been affected or if all of the actions of the action event have not been processed, then further comprising leaving the view of objects unchanged.

16. The method of claim 9, wherein determining whether the view of objects has been affected as a result of processing the action comprises determining whether a visible attribute of the object has been changed.

17. A signal bearing medium, comprising a program which, when executed by a processor, performs a method, comprising:
   receiving an action event indicating that at least one action is to be performed on at least one object;
   tracking each action of the action event;

for each action of the action event:
(i) processing the action;
(ii) determining whether the view of objects has been affected as a result of processing the action;
determining whether all of the actions of the action event have been processed;
refreshing the view of objects, only if the view of objects has been affected and if all of the actions of the action event have been processed.

18. The signal bearing medium of claim 17, wherein tracking each action of the action event comprises invoking an action tracking method.

19. The signal bearing medium of claim 17, wherein tracking each action of the action event comprises setting a counter value equal to a number of actions for the action event.

20. The signal bearing medium of claim 17, wherein refreshing comprises calling a refresh method using a view identifier value uniquely identifying the view of objects.

21. The signal bearing medium of claim 17, wherein receiving the action event indicating that at least one action is to be performed on at least one object comprises receiving an input to perform more than one action on more than one object.

22. The signal bearing medium of claim 17, wherein receiving the action event indicating that at least one action is to be performed on at least one object comprises receiving an input to perform more than one action on the at least one object.

23. The signal bearing medium of claim 17, wherein the at least one object comprises at least one of shortcuts, desktop icons, folders, files, images, menu items, tool bar icons, buttons, users, groups, servers, workstations, printers, disk drives, I/O devices, applications, processes, and threads.

24. The signal bearing medium of claim 17, wherein if either the view of objects has not been affected or if all of the actions of the action event have not been processed, then further comprising leaving the view of objects unchanged.

25. The signal bearing medium of claim 17, wherein determining whether the view of objects has been affected as a result of processing the action comprises determining whether a visible attribute of the object has been changed.

* * * * *